United States Patent

[11] 3,611,101

| [72] | Inventors | William Kiffmeyer<br>Bayside;<br>Odo J. Struger, Milwaukee; Joseph D. Radtke, Milwaukee; Harold Windler, Hales Corners, all of Wis. |
|---|---|---|
| [21] | Appl. No. | 19,942 |
| [22] | Filed | Mar. 16, 1970 |
| [45] | Patented | Oct. 5, 1971 |
| [73] | Assignee | Allen-Bradley Company<br>Milwaukee, Wis. |

[54] MULTILOOP POSITIONING CONTROL SYSTEM
9 Claims, 3 Drawing Figs.

| [52] | U.S. Cl. | 318/594, 318/603 |
|---|---|---|
| [51] | Int. Cl. | G05b 11/18 |
| [50] | Field of Search | 318/594, 592, 603 |

[56] References Cited
UNITED STATES PATENTS

| 3,473,100 | 10/1969 | Anger | 318/594 |
|---|---|---|---|
| 3,493,827 | 2/1970 | Tinkler | 318/594 |

*Primary Examiner*—Benjamin Dobeck
*Attorneys*—Thomas O. Kloehn and Arthur H. Seidel ABSTRACT: A servoamplifier forming part of a multiple feedback control system drives an electric motor to move a machine to a programmed final position in response to an error signal. A position transducer connected to sense the movement of the machine generates an analog error signal determined by the distance between the machine position and the transducer reference point. A position data control senses the level of the analog error signal and enters a digit into a position storage when the machine moves a unit distance. The position storage compiles these entries and produces a digital absolute feedback signal that indicates the present position of the machine. A command signal generator, in response to each such entry into the position storage, electrically shifts the transducer reference point a unit distance in the direction of machine travel. A digital position comparator generates a digital error signal to a loop control switch when the distance between the programmed final position is greater than two units. When the digital error signal is at a predetermined level, the loop control switch connects the analog error signal coming from the position transducer to the servoamplifier input to drive the machine to its final position.

INVENTORS
WILLIAM W. KIFFMEYER
ODO J. STRUGER
JOSEPH D. RADTKE
HAROLD W. WINDLER

BY

Thomas O. Kloch

ATTORNEY

3,611,101

MULTILOOP POSITIONING CONTROL SYSTEM

BACKGROUND OF THE INVENTION

The basic objective of a numerical positioning control system is to move a portion of a machine as rapidly as possible from one point to another. This is usually accomplished by the use of a closed loop servosystem. In such systems an error signal having a polarity indicating the direction of desired travel and a magnitude indicating the distance of desired travel is injected into a servoamplifier which drives an electric or hydraulic motor on the machine. A transducer is mechanically linked to sense the motion of the machine and feed back a signal to the input of the servoamplifier which will null the error signal when the machine has reached the programmed final position.

There are two basic types of transducers used in positioning control systems; an incremental feedback transducer, and an absolute feedback transducer. In the first type, the feedback signal is interpreted merely as a numerical value corresponding to an amount of machine displacement. While the second generates a feedback signal indicating the actual location of the machine from a fixed reference position. Additionally, the feedback signals produced by position transducers may be either an analog or digital feedback signal.

Some position control systems use the absolute analog feedback signal method. However, because of the limited resolution of the absolute analog method, it is customary in these position control systems to use a plurality of position transducers, each having progressively narrower operating ranges to provide greater accuracy as the programmed final position is approached. An electronic switching circuit such as that shown in U.S. Pat. No. 3,240,951, to Lynn H. Matthias and Odo J. Struger issued Mar. 15, 1966 and entitled STATIC SWITCH FOR MULTISPEED ERROR DETECTOR CONTROL SYSTEM is used to shift control progressively from the coarse to the fine position transducers as the machine approaches the programmed final position. To increase the accuracy of such position control systems, therefore, additional position transducers must be provided along with the additional switching circuitry.

A second approach is the use of a position transducer that generates an incremental feedback signal. These systems are usually digital, and when the machine moves a predetermined amount, the position transducer accurately records this by generating an electric pulse or digit. These pulses are either subtracted directly from the digitally stored final position command signal or are accumulated to form a digital absolute feedback signal which is compared periodically to the digital command signal to produce an error signal representing the distance to be traveled. In either of these cases, incremental or absolute programmed, there are a number of problems encountered when an incremental feedback signal is used. Because control systems operate in an industrial environment, noise signals are often induced into their circuitry. These signals may be interpreted as pulses from the position transducer which ultimately result in an inaccurate error signal. Additionally, the accuracy or resolution of the system is limited to the finite distance the machine must travel to initiate a pulse from the position transducer.

Both of these problems can be minimized by decreasing the incremental distance needed to register the pulse. Such a solution, however, is not without cost because the capacity of storage circuits must be increased to accommodate smaller signal increments, and the speed with which the counts from the position transducer are registered must be substantially increased. Also, decreasing the incremental distance needed to produce a pulse from the position transducer does not solve the noise problem, but only decreases the error introduced when the noise pulses register.

SUMMARY OF THE INVENTION

This invention relates to a position control system which combines the advantageous features of the incremental feedback method with the advantageous features of the analog absolute feedback method by combining an analog feedback loop and a digital feedback loop into a single system. More particularly, the invention resides in a servoamplifier connected to drive the machine motor; a position transducer which produces an analog error signal related in magnitude and polarity to a transducer reference point, a digital error signal generator connected to receive the analog error signal and generate a digital error signal; and a loop control switch which connects the digital error signal to the servoamplifier input until the machine comes to within a predetermined distance from its programmed final position, at which time the analog error signal from the position transducer is connected to control the servoamplifier input until the programmed final position is reached. The invention also relates to a control system in which the digital error signal generator has a position data control circuit connected to receive the analog error signal and control the entry of a digit into a position storage circuit when this error signal reaches or surpasses a predetermined level, and the system has a command signal generator connected to electrically or mechanically move or reset the position transducer reference point an incremental amount when a digit is registered in the position storage.

A general objective of the invention is to provide a hybrid position control system which operates with digital feedback for large movements of the machine by registering and remembering the number of times the position transducer reference point is repositioned, and switching the system to an analog feedback system when the machine nearly reaches its programmed final position.

Another objective of the invention is to use an analog position transducer which is accurate for small increments of machine displacement and to provide circuitry which periodically repositions the reference point from which the transducer measures distance to keep its signal output well within the accurate operating range of the transducer.

Still another objective of the invention is to provide an incremental feedback system in which false counts caused by factors such as noise can be neglected by utilizing the additional information contained in the analog error signal which is not available in digital incremental feedback systems.

A more specific objective is to provide a system in which a position transducer can be used to generate a feedback signal in a digital feedback system, and to generate an analog error signal in an analog feedback system.

Other objects and advantages will appear from the description to follow. In the description, reference is made to the accompanying drawings, forming a part hereof, in which there is shown, by way of illustration and not of limitation, a preferred embodiment of the invention.

DESCRIPTION OF THE PREFERRED EMBODIMENT

Figure 1:
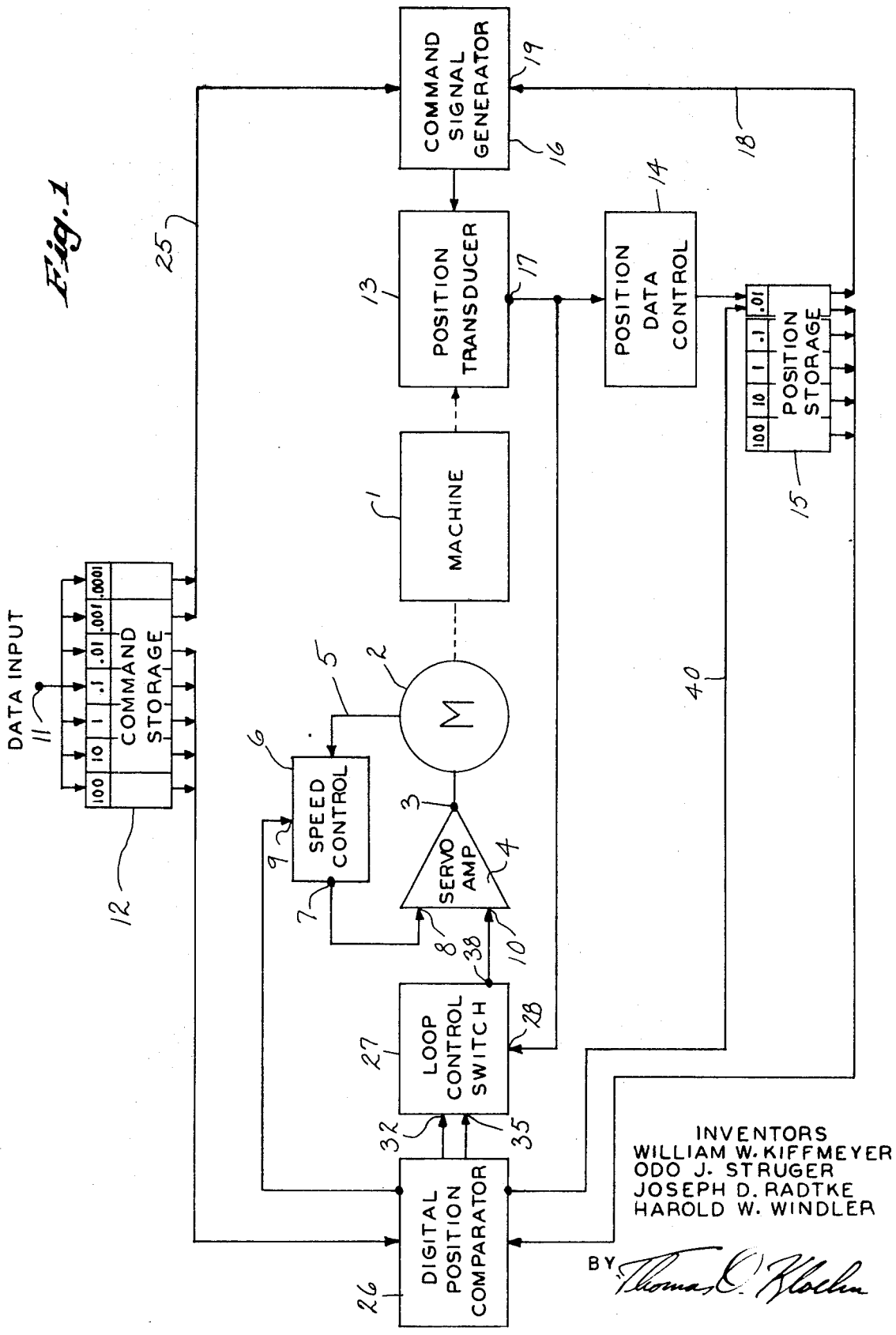
FIG. 1 is a block diagram of the preferred embodiment of the multiloop position control system.

The block diagram of FIG. 1 shows a machine 1 mechanically linked to a motor 2 which will drive the machine 1 from a zero reference position to a programmed final position. The machine 1 is typically a machine tool, such as a drilling or milling machine, in which rapid and accurate positioning from point to point is desired. The motor 2 is a DC electric motor, however, any prime mover having a controllable speed is satisfactory. The field coils (not shown) of the DC motor 2 are supplied a constant DC voltage while the motor armature receives current from the output terminal 3 of a servoamplifier 4. The polarity and magnitude of the output signal from the servoamplifier 4 determines the direction and speed of motor rotation. There are numerous methods known to those skilled in the art for electrically controlling the direction and speed of motor rotation and any of these methods can be used as the output stage of the servoamplifier 4. Motor speed and direction is sensed by measuring the voltage drop across a current-sensing resistor (not shown) in series with the armature winding, and feeding this information through a line 5 to a speed control 6. The speed control 6 develops a feedback signal at its output terminal 7 which is connected to an input terminal 8 on the servoamplifier 4. The magnitude of this feedback signal varies to maintain the speed of the motor 2 constant at a predetermined value. The speed control 6 exercises control over the magnitude of this feedback signal to slow the motor down when a slowdown command signal is received at its input terminal 9.

The multiloop position control system is designed to start the machine moving in the proper direction at the predetermined maximum speed, to decelerate it in steps as the programmed final position is approached, and to bring it smoothly to a stop at the programmed final position. This is accomplished by first injecting a constant DC error signal into a second input terminal 10 on the servoamplifier 4, the polarity of which determines the desired direction of machine movement; generating slowdown command signals to the input terminal 9 of the speed control 6 when the machine is typically 1 inch and 0.1 inch from the programmed final position; and finally, initiate a gradual and continuous decrease of the DC error signal when the machine is between 0.005 and 0.02 inch from its programmed final position.

The final position data needed to generate an error signal for the servoamplifier 4 is fed into a data input terminal 11. The data originates from either a punched tape reader or a manual data input (not shown) and is processed by a decoding block (not shown) to be received in a command storage circuit 12. This final position data is stored in seven decimal digits from 0.0001 to 100 in a natural binary coded decimal format. The command storage 12 is scanned sequentially from the least significant decimal digit of the programmed dimension to the most significant decimal digit. The output of the command storage 12 is scanned serially, to minimize the duplication of equipment by allowing the use of time sharing of components when the control system forms a part of a larger multiaxis control system.

To obtain the desired error signal at the input terminal 10 of the servoamplifier 4, the final position data stored in the command storage 12 is periodically scanned and compared with a digital absolute feedback signal that indicates the present position of the machine 1. To generate this digital absolute feedback signal the present position of the machine 1 must first be accurately determined and converted into a digital form. This is accomplished in the preferred embodiment by mechanically attaching a position transducer 13 to the machine 1. The position transducer 13 generates an accurate analog error signal for a range of machine displacement of at least 0.02 inch.

Because the position transducer 13 is chosen to indicate accurately small displacements, it cannot be used alone to measure large machine displacements. However, by a unique method of repositioning, or resetting, the position transducer reference point, a single position transducer 13 is used. The position transducer reference point, when used herein, refers to a machine position which will result in no analog error signal output from the position transducer 13. Applying this reset method, the position transducer reference point is reset when the machine moves at least 0.01 inch, and the new null, or position transducer reference point is advanced 0.01 inch in the direction of machine motion.

Resetting of the position transducer 13 is accomplished by means of a closed loop system having a position data control 14, a position storage 15 and a command signal generator 16. As the machine moves and the transducer reference point is reset, the magnitude of the analog error signal appearing at the output terminal 17 swings repeatedly over a voltage range. During ideal operating conditions this voltage cycle repeats once for each unit distance of machine displacement, or in the preferred embodiment, approximately each 0.01 inch. The analog error signal is fed to the input of the position data control 14 which is designed to generate a DC level at its output when the analog error signal reaches or surpasses a predetermined voltage level. The output of the position data control 14 is a voltage level which is maintained as long as the analog error signal surpasses the predetermined level. The polarity of the voltage level is determined by the direction the machine 1 is moving.

The voltage level produced by the position data control 14 is fed to the position storage 15. The position storage 15 also receives a clock signal from an external source (not shown) which makes an entry into the position storage 15 when the position data control output indicates the predetermined error level has been reached. Each such entry constitutes an incremental feedback signal, which indicates an average machine displacement of one unit distance, or 0.01 inch. The displacement from the reference point at which digital entry occurs can be intentionally adjusted by changing the position data control 14 to sense a different analog error signal level. Under normal operating conditions the distance represented by this incremental feedback signal is also subject to unintended variations such as that caused by noise. A unique feature of this invention, to be described below, is the ability to compensate for these unintended and undesirable variations in the amount of machine displacement occurring between incremental feedback signals. As a consequence, the incremental feedback signal herein differs from those in prior systems in its retention of the information necessary to correct error caused by factors external to the control system.

The position storage 15 compiles the 0.01-inch entries made by the incremental feedback signal into a digital absolute feedback signal which represents the total machine displacement from a zero reference point. The decimal digits 0.01 through 100 of this up-to-date machine position dimension are stored in a series of shift registers in natural binary coded decimal.

The additions made to the 0.01 decimal digit in the position storage 15 by the incremental feedback signal are indicated by a voltage change at an output 18 which is connected directly to the input 19 on the command signal generator 16. As will be discussed below, the command signal generator 16 is appropriately designed to work in combination with the position transducer 13. When a signal is received at the input terminal 19, a command signal is generated by the command signal generator 16 which causes the transducer reference point to reset exactly 0.01 inch in the direction of machine motion. By feeding back information derived from entries made to the position storage 15 to reset the position transducer 13, the analog error signal is caused to shift in voltage level with the result that the DC output level of the position data control 14 drops back to zero.

The closed loop thus formed provides two functions. First, as discussed previously, it serves to periodically reset the position transducer reference point to keep the position transducer 13 within its operating range. Secondly, it provides a means of retaining the information necessary to generate incremental feedback signals that will correct automatically for errors caused by noise or miscounts.

The self-correcting feature of the closed loop operates as follows. The erroneous additional entry to the position storage 15 is sensed at the input terminal 19 of the command signal generator 16 similar to a correct entry. Consequently, the command signal generator 16 repositions the transducer reference point an additional 0.01 inch in the direction of machine travel. This causes the analog error signal level at the output of the position transducer 13 to increase accordingly with the result that the machine 1 must travel an additional 0.01 inch before the magnitude of the analog error signal will reach the level it had attained prior to the injection of the erroneous entry. In other words, the machine 1 must travel an additional unit distance of 0.01 inch before the position data control 14 senses the necessary level to make another entry into the position storage 15. The closed loop causes the system to skip an entry, thus correcting for the erroneous entry. A correction is also made for missed counts. In this case, the analog error signal remains below the predetermined voltage level when the first entry is made after the missed count. A second entry must be made to reset the position transducer reference point an extra time before the analog error signal again rises above the predetermined level.

Figure 3:
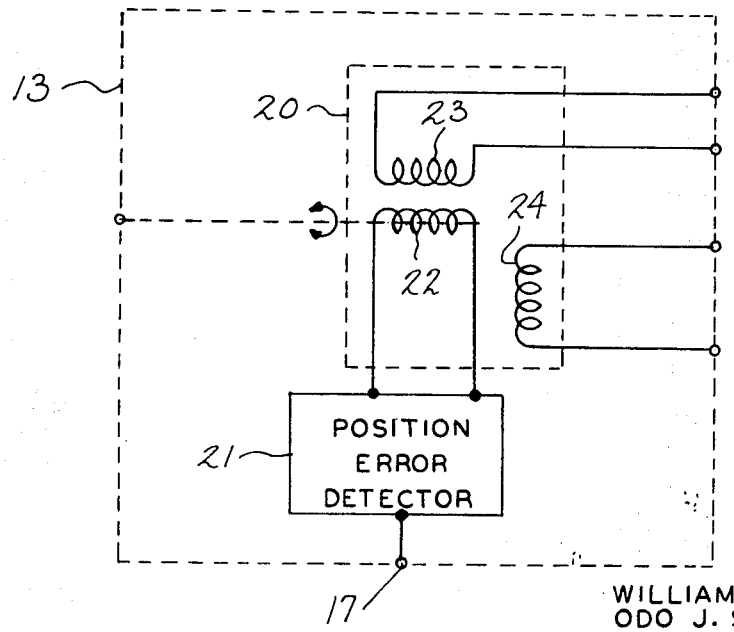
FIG. 3 is a schematic block diagram of the position transducer shown in FIG. 1.

As shown in FIG. 3 the position transducer 13 used in the preferred embodiment of the invention is comprised of a resolver 20 and a position error detector 21. The use of rotary or linear resolvers as position-sensing devices is well known to those skilled in the art. The rotor 22 is mechanically coupled to rotate 36 for each 0.01 inches of machine travel. A sine exciter winding 23 and a cosine exciter winging 24 are each connected to receive 2 kHz. command signals from the command signal generator 16. As is well known in the art, when carrier signals are applied to the exciter windings 23 and 24 in a trigonometric relationship of $\sin(2\pi/10)n$ and $\cos(2\pi/10)n$, where $n$ is the numeral of the 0.01 decimal digit of the position storage 15, the position modulated carrier signal induced into the rotor 22 will vary as a function of displacement, sinusoidally as the rotor 22 makes a complete 360° revolution. Consequently, there are two rotor positions in which the induced voltage is zero. The position of these zero voltage, or position transducer reference points, is dependent upon the amplitude ratio of the input command carrier signals applied to the exciter windings 23 and 24. For example, if the rotor 22 is at a position transducer reference point, and if the carrier signal amplitude ratios are then shifted 36° [$\sin(2\pi/10)(n+1)$ and $\cos(2\pi/10)(n+1)$] then the rotor 22 must be rotated an additional 36° by the machine 1 to reach the new position transducer reference point. When the carrier signals are changed, the output of the rotor 22 increases in amplitude and then slowly decreases to zero again as the machine 1 travels 0.01 inch. If the applied carrier signals are shifted 36° in the opposite direction [$n-1$] then the machine must move 0.01 inch in the opposite direction to move the rotor 22 to the new position transducer reference point.

The position error detector 21 demodulates the position modulated carrier induced into the rotor 22 of the resolver 20. A preferred position error detector 21 is shown in the copending application of Odo J. Struger filed Apr. 2, 1970, Ser. No. 25,069 and entitled "Detector." This circuit produces an output signal at terminal 17 which varies sinusoidally when the position transducer reference point remains stationary and the rotor 22 makes one complete revolution. Any circuit providing a similar output can be used as the position error detector 21. For example, a circuit which detects phase variations rather than amplitude variations can be used. When operating in the control system, of course, the analog error signal appearing at the output terminal 17 does not vary through a complete sine wave. An interval of about 36° straddling one of the two zero reference points is used, and this interval is continuously retraced as the machine 1 moves and as the resolver 20 is repeatedly reset 36° by the command signal generator 16.

The command signal generator 16 used in the preferred embodiment of the invention generates the 2 kHz. command signals that are applied to the exciter windings 23 and 24. The command signal generator 16 generates a 2 kHz. carrier signal and applies it to a transformer arrangement similar to that disclosed in the U.S. Pat. No. granted to Robert W. Tripp, No. 2,849,668, on Aug. 26, 1958. This patent disclosed a transformer arrangement which produces the desired sine and cosine command signals for the exciter windings 23 and 24 when supplied with the 2 kHz. carrier. The amplitude of these signals can be changed simultaneously in discrete 36°, 3.6° or 0.36° amounts, by switching taps on the transformer arrangement. This switching is accomplished by an electronic switch of the type disclosed in the pending application of Odo J. Struger, Ser. No. 20,583, filed Mar. 18, 1970, and entitled "Static AC Switch."

The electronic switches are controlled by digital signals from the position storage 15 and command storage 12. The command signal generator 16 is connected by the line 25 to receive the 0.001 and 0.0001 decimal digits stored in the command storage 12. These signals are decoded by means familiar to those skilled in the art to actuate electronic switches attached to the 3.6° and 0.36° transformer taps. The 3.6° and 0.36° transformers are set then the 0.001 and 0.0001 decimal digits of the final position dimension are entered into the command storage 12. They remain set at these values until a new final position is programmed. The 0.01 decimal digit received from the position storage 15 is decoded to actuate the electronic switches attached to the 36° transformer.

When the voltage level of the analog error signal at the output of the position transducer 13 actuates the position data control 14, causing the addition of another 0.01 decimal digit into the position storage 15, the command signal generator 16 reads this entry and makes a 36° shift in the position transducer reference point by switching taps on the 36° transformer. This 36° shift in the position transducer reference point is translated mechanically into 0.01 inches of machine movement. The command signal generator continues to shift the position transducer reference point in this manner each time the machine 1 moves approximately 0.01 inches.

The position storage 15 maintains an up-to-date summation of the incremental feedback signals received from the position data control 14. Consequently, a scan of the five decimal digits stored therein gives a digital absolute feedback signal representing the present position of the machine. A digital position comparator 26 received in serial form the five decimal digits from the position storage 15 and the five most significant decimal digits from the command storage 12. By means familiar to those skilled in the art the arithmetic difference between the digital feedback and digital command signals is obtained to produce a digital error signal. The digital error signal represents the distance and direction the machine 1 must travel to the programmed final position. When the machine 1 approaches to within 1 inch of its final position, a slow down command signal is transmitted from the digital position comparator 26 to the speed control 6. A second slow down command signal is generated when this distance is reduced to 0.01 inches.

Figure 2:
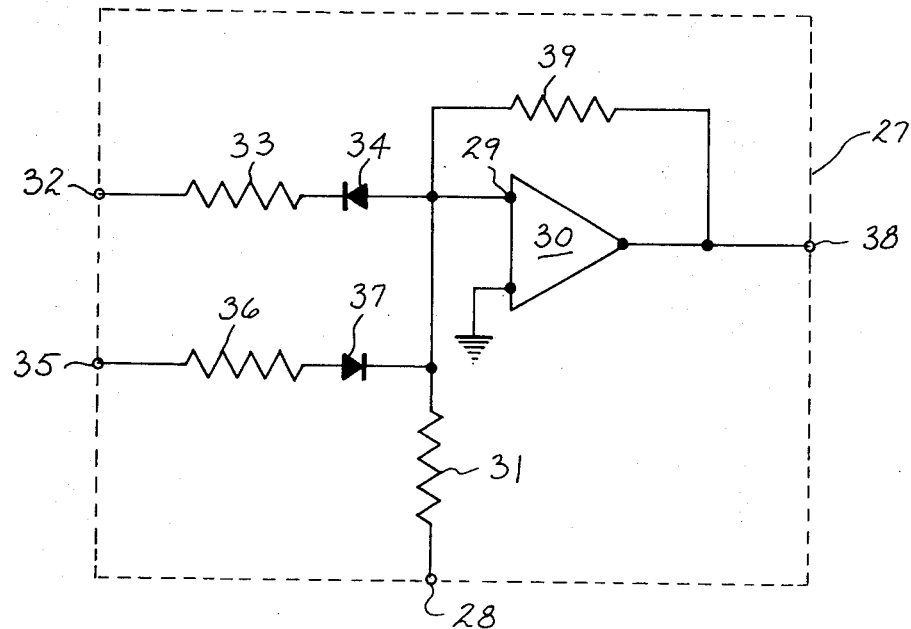
FIG. 2 is a schematic electrical diagram of the loop control switch shown in FIG. 1.

A loop control switch 27 is connected to receive both the digital error signal from the digital position comparator 26, and the analog error signal from the position transducer 13. Referring to the schematic diagram in FIG. 2, the analog error signal enters the input terminal 28, which is connected to the inverting input 29 of an operational amplifier 30 through a coupling resistor 31. A negative digital error signal enters input terminal 32, which is also connected to the inverting input 29 through a coupling resistor 33 and blocking diode 34. A positive digital error signal enters through terminal 35, which is connected to the inverting input 29 of the operational amplifier 30 through coupling resistor 36 and blocking diode 37. The noninverting input of the operational amplifier 30 is connected to ground and the amplifier output terminal 38 connects to the input terminal 10 of the servoamplifier 4. The output terminal 38 is also connected to the inverting input 29 through a feedback resistor 39.

The value of the coupling resistor 33 and 36 connecting the digital error signal inputs, are chosen so that when a digital error signal is applied, the output of the operational amplifier 30 saturates at a high voltage. Therefore, when a digital error signal is applied it completely overrides the analog error signal applied through the coupling resistor 31. The value of the coupling resistor 31 determines the gain of the loop control switch 27 for an applied analog error signal. In the preferred embodiment the digital error signal is removed when the machine 1 is approximately 0.02 inches from the programmed final position. At this instant the analog error signal alone drives the operational amplifier 30 and its output remains saturated. The value of coupling resistor 31 is chosen in relation to feedback resistor 39 to allow the amplifier output to come out of saturation when the machine 1 is about 0.01 inches from the programmed final position. This distance can be varied as desired to insure that a sufficient distance is provided to stop the machine 1 smoothly under analog feedback control. The loop control switch 27 serves to effectively switch control of the servoamplifier 4 from the digital error signal, produced by the digital feedback signal, to the analog error signal, produced by the position transducer 13. Or in other words, it effectively switches the positioning control system from one loop, a digital feedback system, to a second loop, an analog feedback system.

This conversion from digital to analog control is initiated as follows. As the machine 1 moves towards the programmed final position stored in the command storage 12, the amplitude of the analog error signal varies periodically with machine displacement from a given positive or negative value through zero to a predetermined voltage level of opposite polarity. This predetermined voltage level is sensed by the position data control 14 and an entry is appropriately made to the 0.01 decimal digit stored in the position storage 15. These entries, or counts, are stored to maintain an up-to-date record of the present position of the machine 1. This up-to-date position is scanned out of the position storage 15 periodically along with the programmed final position in the command storage 12. The difference between these two digital signals produces either a positive or negative digital error signal that drives the motor 2 in a direction which causes this digital error signal to decrease in magnitude. The combined position data control 14, position storage 15, command storage 12, and digital position comparator 26, form a digital error signal generator. When the difference between the digital command signal and the digital absolute feedback signal reaches 0.02 inch, the digital position comparator 26 is locked to cease generating a digital error signal. Simultaneously, the digital position comparator 26 causes additional entries to be made to the 0.01 decimal of the position storage 15 through the line 40 until the digital comparator output is zero. As when erroneous entries are made to the position storage 15, these entries cause the command signal generator 16 to reset the position transducer reference point an additional 0.02 inches. This causes the analog error signal from the position transducer 13 to increase in magnitude an additional amount. Because there is no longer a digital error signal being applied to the loop control of the servoamplifier 4 and motor 2. The operational amplifier 30 of the loop control 27 remains saturated because of the additional 0.02 inches entry made during conversion. When the machine 1 approaches to within approximately 0.01 inches of its programmed final position, this output drops out of saturation and the analog error signal continuously and smoothly slows the machine, bringing it to a stop at the programmed final position. The point where control is switched to the analog feedback loop is easily adjusted to any value by locking the digital position comparator 26 at a different point. Additionally, the point at which the operational amplifier 30 comes out of saturation is adjustable to accommodate the particular machine and speed used.

The invention disclosed herein solves many of the problems encountered by prior positioning control methods. For large machine movements (> 0.01 inch) accuracy is insured by using digital feedback to the servoamplifier 4. Errors caused by induced noise signals are minimized by an additional feedback loop between the position storage 15 and position transducer 13 that compensates for the error. Furthermore, the digital increments handled by the digital feedback system are quite large, thus minimizing the amount and complexity of the storage and logic circuits. Instead of demanding increased accuracy from the digital feedback system, control is switched to an analog feedback system when the programmed final position is approached. This final approach is made by means of a highly accurate analog feedback signal generated by a position transducer 13 that is specifically designed to operate accurately over a small range of machine displacement. This system also allows a significant cost reduction by its unique use of a single position transducer 13 in both the digital and analog feedback loops and for both large and small machine movements.

The aforesaid description of the invention, and the manner of making and using it, is in such full, clear, concise and exact terms as to enable any person skilled in the art to which it pertains, or with which it is most nearly connected, to make and use the same, and sets forth the best mode contemplated by the inventors of carrying out their invention.

In contrast to the foregoing description, the following claims particularly point out and distinctly claim the subject matter which the applicants regard as their invention.

We claim:

1. A position control system for driving a motor-driven machine to a programmed final position, the combination comprising:
    a servoamplifier connected to drive said motor in response to a position error signal;
    a position transducer connected to sense a positional of a machine and generate an analog position error signal having a magnitude varying as a function of the distance between said position of said machine and a position transducer reference point;
    a command signal generator connected to the position transducer and adapted to reset the position transducer reference point to the programmed final position;
    a digital error signal generator connected to sense a position of said machine and generate a digital position error signal when the machine is not in the programmed final position; and
    a loop control switch adapted to connect the digital position error signal to drive the servoamplifier until the machine comes to within a predetermined distance from the programmed final positioned, at which point it connects the analog position error signal to drive the servoamplifier.

2. The position control system of claim 1 wherein, the digital error signal generator has a position data control connected to receive the analog position error signal and is adapted to generate an incremental feedback signal when the analog position error signal surpasses a predetermined magnitude.

3. The position control system of claim 2 wherein the digital error signal generator has:
    a position storage connected to receive the incremental feedback signals from the position data control and is adapted to compile these incremental feedback signals and generate a digital absolute feedback signal;
    a command storage adapted to receive the programmed final position data and generate a digital command signal; and
    a digital position comparator connected to receive the digital command signal and digital absolute feedback signal, and adapted to generate the digital position error signal when there is more than a predetermined arithmetic difference between the digital command and digital absolute feedback signals.

4. The position control system of claim 2 wherein; there is a position storage connected to receive the incremental feedback signals from the position data control with is adapted to compile these incremental feedback signals, and the command signal generator is connected to the position storage to sense when an incremental feedback signal is compiled and reset the position transducer reference point one unit distance.

5. The position control system of claim 3 wherein said digital position comparator stops generating a digital error signal when said machine is a predetermined number of unit distances from said programmed final position and it generates a predetermined number of incremental feedback signals to said position storage.

6. A position control system for driving a motor-driven machine to a programmed final position, the combination comprising:
    a servoamplifier adapted to drive the motor when a position error signal is received at its input;

a position transducer having a transducer reference point, connected to sense the distance between this reference point and the machine position, and adapted to generate an analog position error signal, the magnitude of which is determined by this distance;

a position data control connected to receive the analog error signal, adapted to sense its magnitude, and generate an incremental feedback signal when the magnitude of said analog position error signal surpasses a predetermined level;

a position storage connected to receive the incremental feedback signal, compile a digit representing a unit distance of machine displacement for each such incremental feedback signal received and generate an absolute digital feedback signal;

a command signal generator connected to the position storage and position transducer and adapted to reset the transducer reference point one unit distance for each digit compiled in the position storage;

a digital position comparator connected to receive the digital absolute feedback signal and adapted to generate a digital position error signal when the machine position is greater than a predetermined distance from the programmed final position; and a loop control switch connected to receive the digital position error signal and the analog position error signal and adapted to connect the digital position error signal to the servoamplifier, and to connect the analog position error signal to the servoamplifier when the machine position is within the predetermined distance from the programmed final position.

7. The position control system of claim 6 wherein the digital position comparator is also adapted to generate a predetermined number of digits to the position storage when the machine position is within the predetermined distance from the programmed final position.

8. The position control system of claim 6 wherein the position transducer is a resolver mechanically connected to sense machine displacement, and a position error detector connected to the resolver output and adapted to generate the analog position error signal.

9. The position control system of claim 8 wherein the command signal generator is connected to generate electrical command signals to the resolver that determine the position of the position transducer reference point.

PO-1050
(5/69)

UNITED STATES PATENT OFFICE
CERTIFICATE OF CORRECTION

Patent No. 3,611,101        Dated October 5, 1971

Inventor(s) Kiffmeyer, Struger, Radtke, Windler

It is certified that error appears in the above-identified patent and that said Letters Patent are hereby corrected as shown below:

In the Abstract:

Line 17, after "position" insert --and the present machine position--

In the Background:

Col. 5, Line 15 after "36" insert --°--

Col. 5, Line 16 after "exciter" change winging to --winding--

Col. 5, Line 65 delete initial "No."

Col. 5, Line 66 "disclosed" should be --discloses--

Col. 6, Line 8 "then" should be --when--

Col. 6, Line 31 "received" should be --receives--

Col. 6, Line 38 after "to" insert --reach--

Col. 6, Line 43 change "0.01" to --.1--

Col. 6, Line 61 "resistor" should be --resistors--

Col. 7, Line 36 after "decimal" insert --digit--

Col. 7, Line 44 after "trol" insert --switch 27, the analog error signal is now in control--

PO-1050
(5/69)

UNITED STATES PATENT OFFICE
CERTIFICATE OF CORRECTION

Patent No. 3,611,101          Dated October 5, 1971

Inventor(s) Kiffmeyer, Struger, Radtke, Windler

It is certified that error appears in the above-identified patent and that said Letters Patent are hereby corrected as shown below:

In Claims:

Col. 8, Line 18 "positional" should be --position--

Col. 8, Line 33 "positioned" should be --position--

Col. 8, Line 59 "with" should be --which--

Col. 9, Line 6 after "analog" insert --position--

Signed and sealed this 18th day of April 1972.

(SEAL)
Attest:

EDWARD M. FLETCHER, JR.          ROBERT GOTTSCHALK
Attesting Officer                 Commissioner of Patents